United States Patent
Hodge et al.

[11] Patent Number: 5,903,213
[45] Date of Patent: May 11, 1999

[54] DEVICE FOR ENERGY LOAD CONTROL

[75] Inventors: James G Hodge; Philip A Holliday, both of Christchurch, New Zealand

[73] Assignee: Southpower Limited, Christchurch, New Zealand

[21] Appl. No.: 08/743,162

[22] Filed: Nov. 4, 1996

Related U.S. Application Data

[63] Continuation of application No. PCT/NZ95/00068, Jul. 27, 1995.

[30] Foreign Application Priority Data

Jul. 28, 1994 [NZ] New Zealand ............................ 264114
Jul. 27, 1995 [WO] WIPO ...................... PCT/NZ95/00068

[51] Int. Cl.⁶ .................................................. H04M 11/04
[52] U.S. Cl. ................................ 340/310.01; 340/310.02; 340/310.03
[58] Field of Search ......................... 340/310.01, 310.02, 340/825.07, 825.52, 825.76, 825.71, 825.79, 310.03; 307/3

[56] References Cited

U.S. PATENT DOCUMENTS

| | | | |
|---|---|---|---|
| 4,200,862 | 4/1980 | Campbell et al. | 340/310 A |
| 4,361,766 | 11/1982 | De Montgolfier et al. | 307/3 |
| 4,446,462 | 5/1984 | Ouellette et al. | 340/825.07 |
| 4,633,218 | 12/1986 | Palsgrove et al. | 340/310 A |
| 5,245,633 | 9/1993 | Schwartz et al. | 375/100 |
| 5,334,975 | 8/1994 | Wachob et al. | 340/825.21 |
| 5,430,430 | 7/1995 | Gilbert | 340/310.01 |
| 5,491,463 | 2/1996 | Sargeant | 340/310.01 |

FOREIGN PATENT DOCUMENTS

| | | |
|---|---|---|
| 459210 | 9/1972 | Australia . |
| 45281 | 3/1979 | Australia . |
| 159 896 | 10/1985 | European Pat. Off. . |
| 3238249 | 4/1984 | Germany . |
| 172898 | 11/1975 | New Zealand . |
| 2 16945 | 10/1988 | New Zealand . |
| 2 171 278 | 8/1986 | United Kingdom . |

*Primary Examiner*—Jeffery A. Hofsass
*Assistant Examiner*—Julie B. Kieu
*Attorney, Agent, or Firm*—Pillsbury Madison & Sutro LLP

[57] ABSTRACT

A system for receiving inputs including ripple signals, input port conditions and clock conditions, and operating on information contained therein, receives a ripple signal, converts the signal to a digital form, and operates on multiple outputs that can act as interfaces with other peripheral devices depending on information in the received signal. The system can be used as a load control device in an electrical network of an industrial, domestic or commercial complex in conjunction with other load control devices.

22 Claims, 1 Drawing Sheet

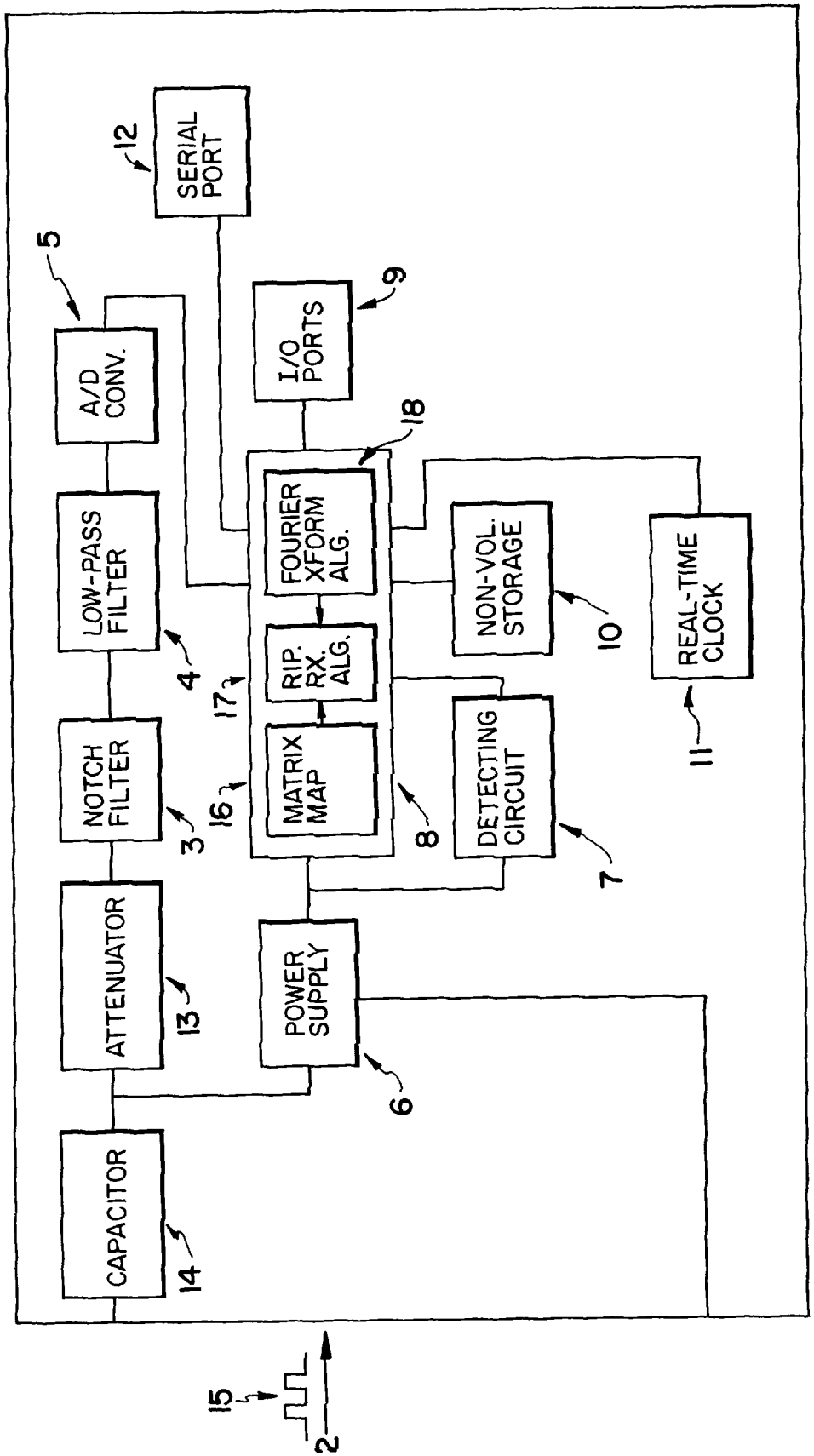

DEVICE FOR ENERGY LOAD CONTROL

This is a Continuation of International Appln. No. PCT/NZ95/00068 filed Jul. 27, 1995 which designated the U.S.

TECHNICAL FIELD

The present invention relates to an apparatus for receiving ripple signals, converting the signals to a digital signal and using these signals. The invention relates to a receiving unit that is capable of decoding received specific ripple signals which cause the unit to operate in the traditional manner of a ripple receiver, but also permit the apparatus to operate in a number of other capacities additionally.

BACKGROUND ART

Traditionally ripple control has been used to transmit information from a power source to a load via the power transmission system to afford remote control of that load. The most common use is in the control of the heating of hot water.

At present, ripple signal receivers are limited to direct control applications wherein they recognise a predetermined signal and execute a predetermined function. They are not capable of recognising more than one input or executing more than one function or set of functions based on the information contained in the inputs. Furthermore, the signal recognition and output function parameters are either limited or set at the time of manufacture so that each receiver is designed and manufactured for a specific purpose.

Currently available receivers are also traditionally associated with or attached to the main switchboard of a building or dwelling, from which a dedicated circuit is wired to the electrical appliance of which the receiver is the controller. The currently available receivers are also unable to decode the ripple signal and transmit the information contained in the signal to other devices.

EP 0159896 discloses a ripple control system wherein the receiver uses a pair of synchronous filters driven 90° out of phase with each other to reject unwanted signals. The emphasis of the invention is on obtaining narrow bandwidth analogue filtering to enable the recognition of a predetermined code which may incorporate more than one frequency. The receiver then executes a predetermined function.

Other ripple receivers are known and include Aust 26102/71 and Aust 45281/79. However those are dedicated to receiving a particular ripple signal and executing a predetermined function or set of functions in response to that code.

NZ 211797, NZ 216945, and NZ 172898 disclose inventions relating to analogue or digital filtering of a wanted ripple signal in a ripple receiver. The inventions emphasise the filtering of a wanted ripple signal and do not disclose a selection of output functions which are dependent on one or more received ripple signals.

DISCLOSURE OF INVENTION

An object of a the present invention is the provision of digital ripple receiver apparatus which can be used in conjunction with individual items of electrical equipment or electrical loads at the point of consumption of the electricity. A further object of the present invention is the provision of an apparatus that can be programmed to recognise multiple coding systems for ripple signals. A still further object of the invention is the provision of apparatus that can perform a variety of output functions in response to the receipt of any given input message in a ripple signal.

For the purposes of this specification a ripple signal is defined to include information transmitted via the electricity network of a supply authority or within a building or within an industrial, domestic or commercial complex in a frequency different from the mains power frequency. Such information may be in the form of "telegrams" (information or commands of a specific length, e.g. 50 bit systems) and/or may incorporate commands to the signal receiving apparatus, information for control of the circuit in the ripple receiver or any other information capable of being sent or received in a ripple signal. Preferably the signal frequency will be in the range 50–2000 hertz.

The present invention provides an apparatus for receiving one or more inputs including ripple signals and operating on the information contained therein, said apparatus including: means for receipt of said ripple signal; means to convert said signal from analogue form to a digital form; microcontroller means which is capable of operating on one or more of a plurality of output ports in a manner which can be selected from a range of programmable options, said selection being dependent on the information contained in said received inputs, wherein each output port is capable of acting as an interface with other peripheral devices; and one or more serial communications ports.

Preferably said means for receipt of the ripple signal includes an input capacitor, an attenuator, a mains notch filter and a low pass filter. Preferably the analogue to digital converter converts the analogue voltage of the signal to an eight bit digital signal.

The other peripheral devices to which said apparatus can be connected include any item of electrical equipment, another electrical or electronic circuit, a circuit which returns the ripple signal or some other signal to the source of the ripple signal, or any other item of equipment which can be controlled from an electrical input.

Preferably there are eight single bit ports which can be defined as Input, Output or Null (not used). The equipment attached to the port will determine the characteristics of the port. There can thus be one or more serial communications ports. Preferably also, the apparatus incorporates a real time clock and a power storage device to maintain the operation of the clock if the external power supply is interrupted or disconnected. This can also be connected to the microcontroller means.

BRIEF DESCRIPTION OF DRAWING

By way of example only, a preferred embodiment of the present invention is described in detail with reference to the accompanying drawing which is a schematic plan of the electrical circuit of the apparatus of the present invention.

BEST MODE FOR CARRYING OUT THE INVENTION

Referring to the drawing, the ripple apparatus 2 incorporated in or attached to, for example a hot water cylinder, detects the presence of a ripple signal 15 impressed on the normal mains signal. In New Zealand, for example, this signal is at 50 Hertz. The normal, nominal voltage level of the ripple signal is 0.55% of the mains voltage (1.2 volts rms).

An input capacitor 14 provides a low loss voltage drop from the mains input signal voltage to an appropriate working voltage. An attenuator 13 reduces this input signal further so that the level is suitable for the signal to be used by a mains notch filter 3. This filter 3 provides high attenuation of the 50 Hz mains frequency so that the output signal from the filter 3 of the 50 Hz signal is of the same order as the level of the ripple signal 15 carried thereon. The signal 15 passes to a low pass filter 4 which attenuates the signal frequencies which are above the highest wanted ripple frequency. This provides an anti-aliasing function (to reduce any effect from sampling the signal too slowly and thus obtaining a false result in an analogue to digital converter 5). The filter 4 concentrates on the removal of high order harmonics of the mains frequency.

The signal from the low pass filter 4 is fed to the converter 5. The converter 5 is controlled by a micro-controller 8. The converter 5 measures the level of the analogue signal and converts it to an 8 bit digital signal.

A power supply 6, including a rectifier, smoothing capacitor and voltage regulator (none shown), provides power for the circuit. A detecting circuit 7 monitors the supply voltage fed to the input of a voltage regulator in the power supply 6. The failure circuit 7 sends a signal to the micro-controller 8 if the voltage in the circuit falls below a predetermined, preset voltage. If the micro-controller 8 receives such a signal it executes a preset operation to store the state of the apparatus 2 in a non-volatile storage area 10. Input/output ports 9 interface the apparatus 2 to peripheral equipment (not shown) via relays and switches of known type.

A real time clock 11 can be incorporated into said apparatus 2, if so desired. The clock 11 is capable of interrogation by the micro-controller 8 to determine if certain or any time dependent functions should be performed. A serial port 12 can be used to transfer data to the non-volatile storage device 10 and/or can be used to output data functions from the apparatus 2.

The micro-controller 8 includes a program code for a ripple receiver algorithm 17 for control of the converter 5 and for reading a sample of the incoming signal to the converter 5 at a precise time. The micro-controller 8 also includes the instructions for the operation of a map 16 which defines the operation of the peripheral equipment attached to the apparatus 2 via the ports 9, subject to the triggers which are determined from or contained in the ripple signals.

The map 16 contains a list of up to 16 triggers, a list of up to 16 functions and a matrix. The matrix lists triggers along the y axis and eight ports 9 along the x axis and cells. A function can be chosen from a pre-determined list of functions and placed at any cell or cells within the matrix provided the function and the port type 9 are compatible. Thus the action to be taken for a given trigger signal is defined. Not all cells need be filled. An empty cell indicates that no change is to be made to the current function operating at the corresponding port 9 from the trigger event associated with that row (or port 9).

The triggers can be any of the following, or a combination thereof:
  a ripple telegram, in digital form which can be compared with any incoming ripple signal or telegram;
  a time trigger, which trigger may include a time in the form of a day of the week, an hour a minute or second, or any combination. This can only be used if the clock 11 is present in the apparatus 2;
  a time range trigger, which may define an inclusive time range between two times including daily, weekly, hourly. This option can only be used if the clock 11 is present in the apparatus 2;
  a time out trigger. A timer can be defined to count down a programmable time and upon reaching zero will generate a trigger event. There can only be one such trigger per port 9;
  a trigger to check the clock 11;
  a trigger that is only operated on start up of the apparatus 2; and
  a condition at an input port.

The following are possible functions:
  an 'on' function to turn the associated port 9 on;
  an 'off' function to turn the associated port 9 off;
  a pulse function, turning the associated port 9 on for a programmable period of time, and then off. This action may include a delay time which is also programmable. This function may only be associated with an output port 9;
  a cyclic function which puts the associated port 9 through a cycle of on and off and repeats the cycle for a programmable number of times. This function may also be delayed from starting programmably, or operate for a set period of time which again can be programmable;
  a repeat function to generate a data packet containing a received ripple telegram through an output port 9;
  a function to reset the clock 11, or to set it to a programmable time; and
  a function to output the clock 11 time through the serial port 12.

Thus the apparatus 2 can be preprogrammed to operated an item of electrical equipment (not shown) on receipt of a specific signal from the micro-controller 8. The apparatus 2 can also act as a multiple logic unit, i.e. it can be used as a programmable unit for specific functions without the need for a ripple signal input as a command.

The program code (in the micro-controller 8) for a ripple receiver algorithm 17 for control of the converter 5 and for reading a sample of the incoming signal at a precise time is based on an algorithm 18 which uses a discrete Fourier transform. The transform implements a bandpass filter with a sin (x)/x response at a fixed frequency. This frequency is dependent on the sampling rate of the converter 5. The algorithm uses two accumulators (real and imaginary).

The real accumulator is the sum of the individual samples multiplied by the sine of the angle of the sampled frequency. The imaginary accumulator is the sum of the individual samples multiplied by the cosine of the phase of the sampled frequency. If a sampling rate of 4 times the wanted frequency (4 dft) is used then the samples are made at 0, 90, 180 and 270°. The sine and cosine of these angles are either 1, 0 or −1. Thus the algorithm reduces to the following rules:
  For the 0° sample add the value read from the converter 5 to the real accumulator;
  For the 90° sample add the value read from the converter 5 to the imaginary accumulator;
  for the 180° sample subtract the value read from the converter 5 from the real accumulator; and
  for the 270° sample subtract the value read from the converter 5 from the imaginary accumulator.

If the sample is at eight times the wanted frequency (8 dft), then for the additional samples 0.707 is added or subtracted from each of the real and imaginary accumulators. The 8 dft sampling has a better response in respect of the alias frequencies occurring in a 50 Hz mains signal, but has other disadvantages.

The total time over which the samples are taken determines the bandwidth of the filter—the more samples taken the narrower the filter. In practice it has been found that the most useful filter samples at 4 dft above 500 Hz and at 8 dft below 500 Hz. This maximises the reduction in the aliasing problems.

As it is necessary to produce an estimate of the signal power more frequently than every 500 msec, the sampled data is stored in a 'first in first out' queue of accumulators (not shown). Thus a measure of the wanted signal power can be obtained by summing the queue of accumulators and processing the sum of the squares as normal.

In order to reject the mains frequency component and its harmonics from the ripple signal, it has been found in practice that it is necessary to make the total sampling time a multiple of the reciprocal of the mains frequency. Thus if the mains frequency is 50 Hz the sampling time must be a multiple of 20 msec.

The number of times the signal can be sampled will depend on the ability of the timer in the micro-controller 8. In practice it has been found that a timer operating in increments of 2 μsecs is appropriate.

To reduce the step size between adjacent wanted frequencies, the time between samples is chosen to be t and t+2 μseconds, in as regular a pattern as possible, over the four or eight samples, depending on whether a four or eight point dft is being performed, such that frequencies can be chosen in increments of 2 μseconds for a micro-controller, which operates in increments of 2 μseconds.

These above described variables of the algorithm are all capable of being programmed into an eight bit micro-controller 8. Also, all variables can be reprogrammable, if so desired. Thus the variables can be determined once the nature of the installation of the apparatus 2 is determined, or after installation. A sixteen bit micro-controller may be used, if so desired.

The above described apparatus 2 has been described with reference to operation by an incoming trigger signal in a ripple signal. This trigger can be in the form of a ripple telegram. The information contained in the telegram can be of any type capable of being inserted in such a telegram. For example, such information may be power tariff rates. The trigger may be programmed to operate the apparatus 2 attached to the associated output port 9 only when the tariff falls below a certain, pre-set value. The information in the telegram may be a time against which a pre-set time is to be compared. The information may be prices of other commodities (e.g. gas), triggering the apparatus 2 to operate other equipment or systems, e.g., systems or equipment which are/is gas powered (etc). The trigger could also include a random factor so that some types of equipment are always switched on or off at random.

Thus it will be appreciated that the apparatus 2 or a plurality of devices 2 can be used for indirect load control of an energy network of any size. Whilst the apparatus 2 has been described with reference to a 50 Hz mains power system, it will be appreciated that with appropriate modification the apparatus 2 can be used on systems with alternate frequencies.

The serial port 12 can be used to output data from the apparatus 2 to another device. Thus the apparatus 2 can also be used as a repeater.

We claim:

1. An apparatus for receiving inputs including ripple signals, and operating on the information contained therein, said apparatus including:

a micro-controller having at least one serial communication port; and means for receiving said ripple signal, including an analogue to digital converter which is operated in conjunction with said micro-controller such that said signal is digitally band-pass filtered, said ripple signal having a frequency in the range of 50–2000 Hz;

said means for receipt of said ripple signal further including program code contained in said micro-controller means which controls said converter and contains an algorithm which uses a discrete Fourier transform-implemented bandpass filter of sin(x)/x response at a ripple signal frequency, wherein the programmable sampling rate of said converter is set at a minimum of four times said ripple signal frequency and samples of said signal are taken at 0°, 90°, 180° and 270°;

signal power is determined by summing the squares of the contents of a real and an imaginary accumulator wherein said contents have accumulated over a programmable sampling time which is dependent on the bandwidth of said filter;

the contents of said real accumulator is the sum of samples taken at 0° less the sum of samples taken at 180°, and the contents of said imaginary accumulator is the sum of samples taken at 90° less the sum of samples taken at 270°;

wherein said micro-controller is for operating on one or more of a plurality of output ports according to at least one option in a range of programmable options, said selection being dependent on the information contained in said received inputs, and each output port is capable of acting as an interface with other peripheral devices.

2. An apparatus as claimed in claim 1, wherein said sampling rate is eight times said ripple signal frequency and samples of said signal are taken at 0°, 45°, 90°, 135°, 180°, 225°, 270°, and 315°.

3. An apparatus as claimed in either claim 1 or claim 2, wherein said sampling time is a multiple of the period of the mains frequency.

4. An apparatus as claimed in claim 1, wherein:

said algorithm further includes a real and an imaginary first-in, first-out queue accumulator, each of which comprise a programmable number of storage units each of which stores the sum of a programmable number of samples from said real and said imaginary accumulators respectively;

the number of samples in each said unit and the number of units in each said queue accumulator is determined by said algorithm and is related to said ripple signal frequency; and an estimate of said signal power is determined by summing the squares of the sum of said units in each of said queue accumulators.

5. An apparatus as claimed in claim 4, wherein the time between samples is chosen to be t and t+2 μsec in an alternate regular pattern over each period of said ripple signal frequency.

6. An apparatus for receiving inputs including ripple signals, and operating on the information contained therein, said apparatus including:

a micro-controller having at least one serial port; and means for receiving said ripple signal, including an analogue to digital converter which is operated in conjunction with said micro-controller such that said signal is digitally band-pass filtered, said ripple signal having a frequency in the range of 50–2000 Hz;

wherein said micro-controller is for operating on at least one of a plurality of output ports according to at least one option in a range of programmable options, said selection being dependent on the information contained in said received inputs, wherein each output port is capable of acting as an interface with other peripheral devices;

said micro-controller incorporates non-volatile memory and includes instructions for the operation of a map which defines the operation of said peripheral apparatus attached to said output ports;

said map includes
- at least one programmable triggers including the digital equivalent of one or more ripple signals,
- at least one programmable function including a no change function, and
- a programmable matrix which determines the function performed at each output port for each of said triggers;

said instructions include
- the comparison of said triggers with the information contained in said received inputs, and
- the operation of said functions at said output ports as determined by said matrix;

said means for for receiving said ripple signals can be programmed to recognise a plurality of given coding systems for said ripple signals and includes
- a bandpass filter for filtering the frequency associated with said ripple signal and rejecting unwanted mains, mains harmonics and other signal frequencies, and
- means for digitising said ripple signal;

program code contained in said micro-controller means is for controlling said converter and contains an algorithm which uses a discrete Fourier transform-implemented bandpass filter of sin(x)/x response at a ripple signal frequency;

the programmable sampling rate of said converter is set at a minimum of four times said ripple signal frequency and samples of said signal are taken at 0°, 90°, 180° and 270°;

signal power is determined by summing the squares of the contents of a real and an imaginary accumulator wherein said contents have accumulated over a programmable sampling time which is dependent on the bandwidth of said filter;

the contents of said real accumulator is the sum of samples taken at 0° less the sum of samples taken at 180°; and the contents of said imaginary accumulator is the sum of samples taken at 90° less the sum of samples taken at 270°.

7. An apparatus as claimed in claim 6, wherein said sampling rate is eight times said ripple signal frequency and samples of said signal are taken at 0°, 45°, 90°, 135°, 180°, 225°, 270°, and 315°.

8. An apparatus as claimed in either claim 6 or claim 7, wherein said sampling time is a multiple of the period of the mains frequency.

9. An apparatus as claimed in claim 6, wherein:

said algorithm further includes a real and an imaginary first-in first-out queue accumulator, each of which includes a programmable number of storage units each of which stores the sum of a programmable number of samples from said real and said imaginary accumulators respectively;

the number of samples in each said unit and the number of units in each said queue accumulator are determined by said algorithm and are related to said ripple signal frequency; and an estimate of said signal power is determined by summing the squares of the sum of said units in each of the queue accumulators.

10. An apparatus as claimed in claim 6, wherein the time between samples is chosen to be t and t+2 $\mu$sec in an alternate regular pattern over each period of said ripple signal frequency.

11. An apparatus as claimed in claim 1, wherein said devices programmable variables can be programmed using said serial communications port.

12. An apparatus as claimed in claim 1, wherein said apparatus includes an input capacitor; an attenuator; a mains notch filter; a low pass filter.

13. An apparatus as claimed in claim 1, wherein said apparatus further includes a voltage supply detection circuit which signals said micro-controller means when the circuit voltage falls below a predetermined preset voltage, whereupon said micro-controller stores the state of said device.

14. An apparatus as claimed in claim 1, wherein said peripheral devices include a circuit which injects a ripple signal into an electricity network either of a supply utility or into a network of an industrial, commercial or domestic nature.

15. An apparatus as claimed in claim 1, wherein said apparatus is used in conjunction with individual items of electrical equipment adjacent the point of consumption of the electricity.

16. An apparatus as claimed in claim 15, wherein said apparatus can be embodied in said item.

17. An apparatus as claimed in claim 6 wherein said devices programmable variables can be programmed using said serial communications port.

18. An apparatus as claimed in claim 6, wherein said apparatus includes an input capacitor; an attenuator; and a mains notch filter; a low pass filter.

19. An apparatus as claimed in claim 6, wherein said apparatus further includes a voltage supply detection circuit which signals said micro-controller when the circuit voltage falls below a predetermined preset voltage, whereupon said micro micro-controller controller stores the state of said device.

20. An apparatus as claimed in claim 6, wherein said peripheral devices include a circuit which injects a ripple signal into an electricity network either of a supply utility or into a network of an industrial, commercial or domestic nature.

21. An apparatus as claimed in claim 6, wherein said apparatus can be used in conjunction with individual items of electrical equipment adjacent the point of consumption of the electricity.

22. An apparatus as claimed in claim 15, wherein said apparatus can be embodied in said item.

* * * * *